UNITED STATES PATENT OFFICE.

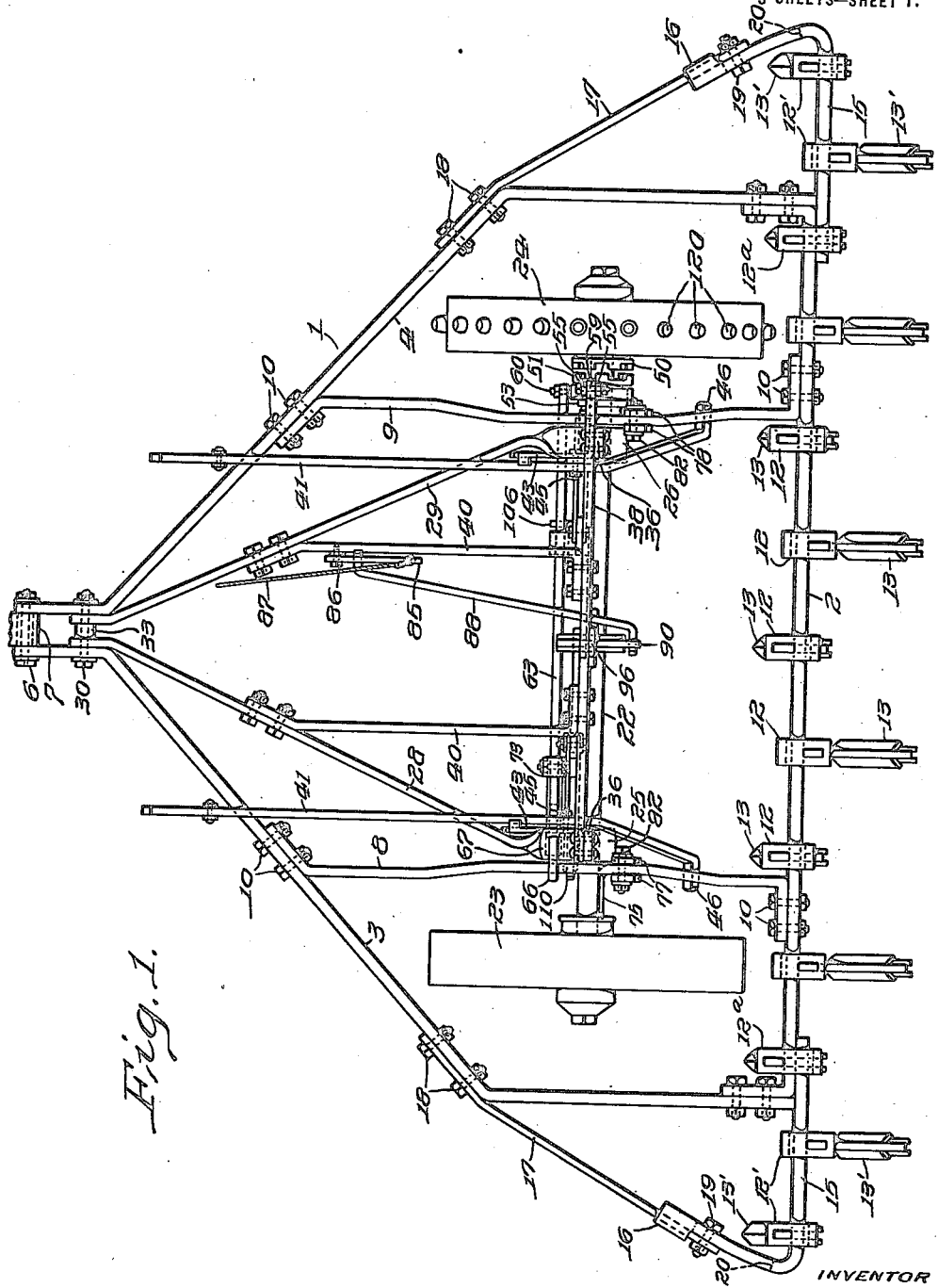

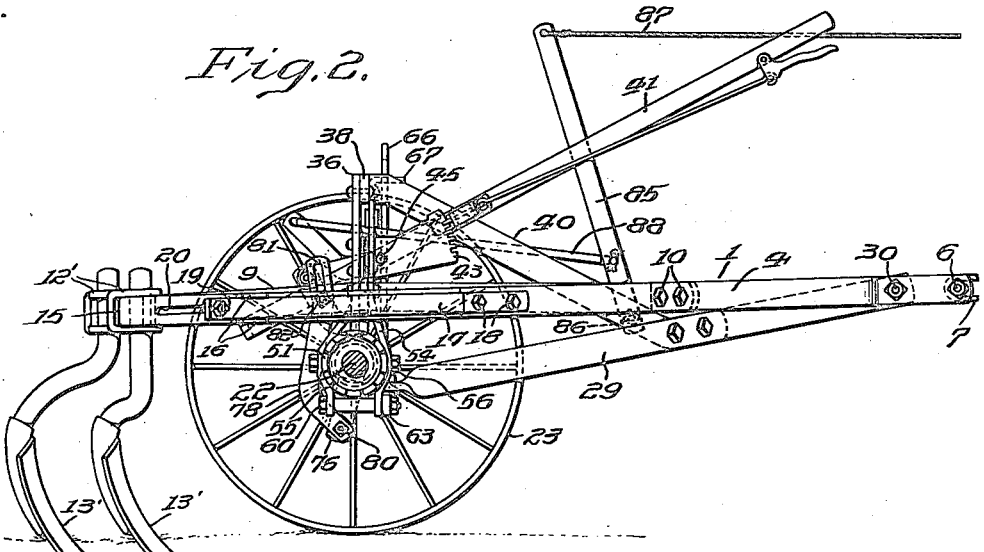
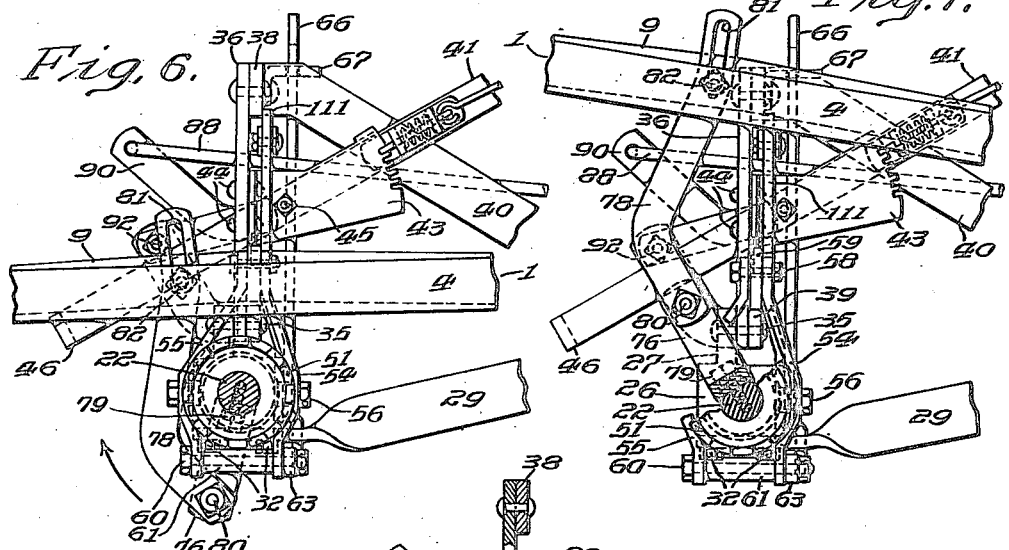
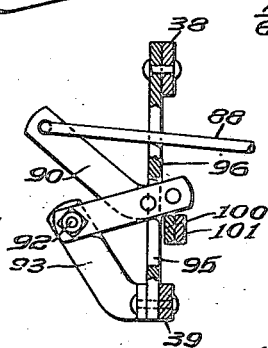

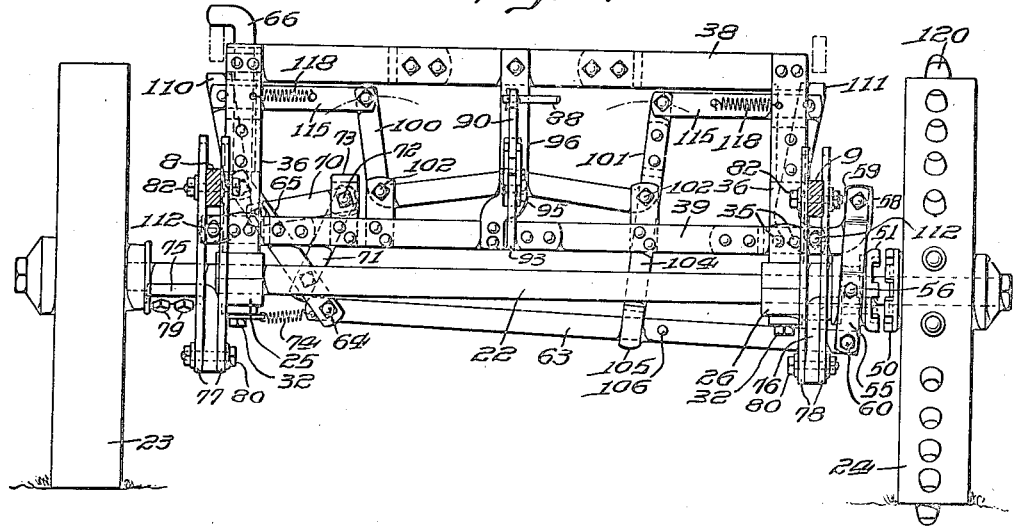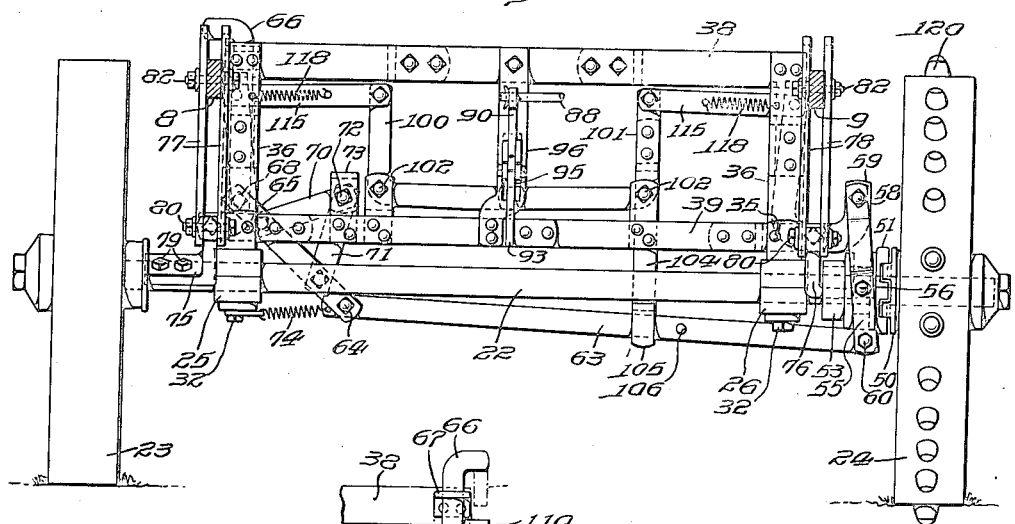

JACOB W. DOWLER, OF PHILADELPHIA, PENNSYLVANIA, ASSIGNOR TO S. L. ALLEN & CO., INC., A CORPORATION OF PENNSYLVANIA.

POWER-LIFT AGRICULTURAL IMPLEMENT.

1,412,781.  Specification of Letters Patent.  Patented Apr. 11, 1922.

Application filed April 19, 1921. Serial No. 462,684.

*To all whom it may concern:*

Be it known that I, JACOB W. DOWLER, a citizen of the United States, and a resident of Philadelphia, county of Philadelphia, State of Pennsylvania, have invented certain new and useful Improvements in Power-Lift Agricultural Implements, of which the following is a specification, reference being had to the accompanying drawings.

My invention relates, more particularly, to that class of implements intended to be drawn by a tractor or other suitable source of motive power, a principal object of the invention being to provide in an implement of this general character means whereby that part of the implement to which the ground working tools are attached may be lifted through power supplied from the movement of the implement as it is drawn forward.

A further object of my invention is to provide means in an implement of the character aforesaid for automatically disengaging the clutch mechanism through which the power is transmitted to effect the lifting of the tool carrying part and for automatically latching or locking the said part in raised position after it has been lifted thereto.

Still further objects of my invention are to generally improve and simplify power lift implements, and to so design and arrange the several means and instrumentalities employed to effect the lifting of the tool carrying part, the disengaging of the clutch mechanism and the latching of the tool carrying part in raised position, that the same may be made of sturdy construction and of a character not liable to get out of order when in use.

My invention further includes all of the other objects and novel features of design, construction and arrangement of the various elements and instrumentalities employed, hereinafter more specifically described or shown in the accompanying drawings.

While for the purpose of carrying out various functions and objects of my invention, I may make use of any suitable instrumentalities or combinations of elements effective for accomplishing the results desired, I have, in the accompanying drawings illustrated a preferred embodiment of means therefor and embodied in an implement intended for the cultivation of the ground, but it will be understood that I do not thereby desire or intend to limit myself solely to the precise means shown, or to any particular style or type of implement adapted for any specific agricultural operation, as my invention may be readily embodied in and utilized in connection with implements other than cultivators if desired.

In the said drawings Fig. 1 is a top plan view of a cultivator embodying such preferred form of my invention, and Fig. 2 is a view in side elevation thereof with certain parts, including the right wheel, removed. Fig. 3 is a rear elevation on a somewhat enlarged scale of a portion of the machine shown in Figs. 1 and 2, certain parts being broken away or shown in vertical section for the sake of clearness and Fig. 4 is a view similar to Fig. 3 but showing certain of the parts in a somewhat different position. Fig. 5 is a fragmentary front view of certain of the parts shown in Fig. 3; Figs. 6 and 7 are still further enlarged fragmentary detail views, principally in side elevation, illustrating portions of the mechanism in different positions, and Fig. 8 is a fragmentary side elevation, partially in vertical section, of still another portion of the mechanism. Like numerals are used to designate corresponding parts in the several figures.

The implement shown in the drawings comprises a main tool supporting frame 1 having a transversely extending rear member 2 and side members 3, 4 secured to the rear member adjacent their rearmost extremities. Each of the side members is preferably directed longitudinally forward from its point of attachment to the rear member for a suitable distance, then directed angularly inward to a point adjacent the center line of the machine and thence forwardly for a short distance as best shown in Fig. 1, the members thus providing two laterally spaced parallel portions provided with apertures adjacent their forward ends for the reception of a bolt 6 over which may be passed a link 7 for conveniently connecting the implement to the tractor or other means by which it is drawn over the ground when in operation. For the purpose of strengthening the main frame and for other purposes to be hereinafter described, a brace 8 is arranged to extend substantially longitudinally between the angularly directed portion of the side member 3 and the rear member 2 and a similar brace 9 between the corresponding portion of the side member 4 and the rear member, said braces being rigidly secured to the members as by the bolts 10. The frame, as well as the braces referred to, is preferably formed of rectangular steel bars disposed with their greatest width in a vertical plane.

It will be understood that the rear member 2 is effective to support through the medium of suitable clamps 12, a plurality of ground working tools 13 of any desired form or construction, the clamps being preferably of such form as to permit the adjustment of the tools along the bar and also vertically with respect thereto as will be readily understood by those familiar with the art. In the particular machine shown in order to increase the area covered by the tools and also to permit the employment of a greater number of tools than could be conveniently and effectively disposed on the rear member 2, removable extension members are provided adapted to be secured to the side and rear members of the frame in such manner as to project laterally outward and thus increase the effective length of the rear member. As shown, these extension members each comprise a bar 15 a portion of which is adapted to parallel the rear member 2 and to be secured thereto, conveniently through the medium of one of the tool clamps 12 which is suitably arranged to receive both the member and the inner end of the bar 15, and the outer end of which is bent angularly forward and provided with lips 16 adapted to receive between them a brace 17, the forward end of which is removably secured by bolts 18 to the rear part of the inwardly directed portion of the adjacent side member 3 or 4 as the case may be, the rear end of the brace being secured, as by bolt 19, to the forward portion of the bar 15, the latter being preferably slotted as at 20 so as to permit relative adjustment between it and the brace. The bars 15 when thus secured in position are adapted to support additional clamps 12' and tools 13' but may be readily removed from the main frame if desired to facilitate shipment or in case the implement is not to be utilized under conditions requiring a maximum number of tools.

The main frame is operatively supported through the medium of the braces 8 and 9 and other means hereinafter to be described, above a transversely extending axle 22 which serves in turn to support adjacent its outer extremities the ground wheels 23 and 24 which, in the normal operation of the machine, are freely rotatable thereon, both the wheels and axle being positioned within the area bounded by the main frame with the axle maintained in substantially parallel relation to the rear member 2 thereof. The axle is supported in suitable journal boxes 25 and 26 each of these boxes being preferably substantially cubical in external form and provided with an upwardly directed transversely disposed lug 27 for a purpose to be hereinafter described. For assisting in holding the boxes in properly spaced relation with the main frame, a pair of struts 28 and 29 are provided and respectively arranged to extend between one of the boxes and a transversely extending bolt 30 positioned between the parallel portions of the side frame members 3 and 4 adjacent the bolt 6. Conveniently each of the struts is formed from a rectangular steel bar the major portion of which is positioned with its greatest width in the vertical plane, but adjacent its rear end the bar is given a half turn so as to provide a horizontal portion adapted to be secured to the under face of the adjacent journal box by a bolt 32. Each of the bars from adjacent the point where it is twisted as aforesaid is directed forwardly, upwardly and angularly inward and thence forwardly parallel to the center line of the machine so as to lie adjacent the corresponding forwardly directed portions of the side members, suitable apertures being provided in the said portions of the struts for the passage of the bolt 30, and between the struts and surrounding the bolt 30 a spacing sleeve 33 may be provided effective to hold the former snugly against the side members of the frame. It will thus be evident that the construction described is adapted to permit relative vertical movement about the bolt 30 between the struts and axle moving as a unit and the main frame.

Suitably secured to each of the lugs 27 as by rivets 35 and extending vertically upward therefrom, is a preferably flat upright 36 and extending transversely of the uprights and rigidly secured respectively adjacent the upper and lower extremities thereof are transversely extending upper and lower beams 38 and 39, the uprights and beams thus forming a substantially rectangular auxiliary frame supported from the axle, braces 40 extending forwardly and downwardly from the upper beam to a point about midway of the length of the struts 29 and rigidly bolted or otherwise secured to the beam and to the struts serving to assist in holding the auxiliary frame in rigid position.

In order to afford under certain conditions a vertical support for the main frame as well as to effect within limits the manual vertical adjustment thereof, two hand levers 41 are provided and respectively positioned on each side of the center line of the machine. Each of these levers is cooperative through a suitably manually controlled latch with a toothed segment or rack 43 rigidly secured to the adjacent upright 36 as by rivets 44, the rear end of the rack being turned at right angles to the main portion thereof so as to give a good bearing or seat against the front face of the upright to insure the rigidity of the rack when secured thereto. Each of the levers 41 is pivoted on a bolt 45 carried by the segment and extends forwardly and upwardly therefrom for a sufficient distance to bring the forward end of the lever into a position for convenient operation, and also extends rearwardly and downwardly from the bolt to a point at which the end of the lever is turned outwardly to form a lug 46 effective to engage the under side of the adjacent brace 8 or 9 as the case may be and form a support therefor, the arrangement being such that when the forward end of the lever is depressed from the position shown in Fig. 2, the brace, and in turn the adjacent portion of the main frame, will be raised vertically with respect to the auxiliary frame and axle about the bolt 30 as a center. As the levers 41 may be independently operated and the main frame, by reason of its relatively great extent, locally twisted or sprung, it is possible to so manipulate the levers as to raise or lower one side of the main frame without corresponding movement of the other side and thus effect a certain amount of angular adjustment of the main frame with respect to the horizontal and corresponding adjustment of the tools carried thereby, a feature of considerable advantage in that it permits shallower cultivation adjacent the trees when the implement is employed in orchard culture.

It will be of course appreciated that under operative conditions it is frequently necessary to lift the main frame in its entirety for a distance sufficient to withdraw the tools from the ground, and as the main frame, tools and other parts carried by and movable therewith are of relatively great weight, means are provided for effecting such lifting through the medium of the power supplied by the forward movement of the implement as it is drawn over the ground. For this purpose a suitable clutch is arranged in such manner as to temporarily lock one of the wheels to the axle so as to effect a partial rotation of the latter and means, including suitable crank arms, are arranged for actuation through this rotation to effect the lifting of the main frame. Additionally, as it is requisite, as will hereinafter more fully appear, to arrest the rotation of the axle after the frame has been lifted for the desired distance, means are provided for automatically throwing out the clutch when this result has been obtained, as well as means for automatically locking or latching the frame in raised position after it has been lifted thereto.

In the form of the invention shown, the several means to which reference has just been made comprise, more specifically, a clutch positioned adjacent the wheel 24 comprising a member 50 carried by and rotatable with the wheel and having engaging lugs or teeth on its inner face and a complementary member 51 having similar oppositely disposed lugs or teeth on its outer face and formed on the outer end of a sliding sleeve 53 positioned on and surrounding the axle 22 and non-rotatable with respect thereto. This sleeve is surrounded by a yoke comprising complementary members 54 and 55 each provided with a stud 56 extending through the member and having its inner end cooperative with a groove formed in the outer surface of the sleeve. The members 54 and 55 are positioned substantially vertically and pivoted adjacent their upper extremities on a horizontal bolt 58 extending through the members and through a vertically positioned lug 59 preferably arranged therebetween, and conveniently formed by extending the bar 39 laterally beyond the adjacent upright 36 and thence vertically upward for a suitable distance. The lower ends of the yoke members extend below the sleeve 53 and are connected by a horizontally extending bolt 60, a spacing sleeve 61 surrounding the bolt and positioned between the members serving to hold them in spaced relation from the sleeve, and for effecting suitable movement of the yoke about the pivot bolt 58, an actuating link 63 is arranged transversely of the machine and movably connected adjacent one of its ends to the bolt 60. The opposite end of the link 63 is movably attached, as by a bolt 64, to one end of a shorter angularly positioned link 65 which in turn is movably connected as by a bolt 68 at its end opposite to that connected to link 63 with the lower end of the vertically extending portion of an L-shaped trip 66 disposed in front of the left hand upright 36 and extending slidably through a guide 67 secured to the forward side of the upper beam 38. In order that substantially longitudinal movement of the link 63 will result in vertical movement of the trip, means are provided for supporting the link 65 in such manner that movement either of the trip or of the link 63 will cause it to swing in a suitable arc, said means preferably comprising a pair of angularly disposed hangers 70 and 71 pivoted to swing on a common center formed by a horizontally disposed pivot bolt 72 carried in an overhanding clip 73 rigidly supported on the lower beam 39, the hangers being secured at their lower ends to the link 65 at spaced points. Conveniently the link 65 is composed of a pair of complementary members positioned one on each side of the link 63 and trip 66, the lower ends of the hangers being received and secured between the said members. The whole arrangement of the parts just described is such that an upward movement of the trip from the position shown in Fig. 4 is effective to pull the link 63 to the left while, conversely, a movement of the link 63 to the right from the position shown in Fig. 3 is effective to move the trip downwardly from the position shown in said figure. A spring 74 is positioned to extend between some convenient point such as bolt 32 and the link in such manner as to exert its tension in a direction to constantly pull the link 63 to the left.

It will thus be evident that a suitable movement of the link 63 to the right from the position shown in Fig. 3 will be effective to engage the cooperating elements of the clutch thereby locking the power wheel 24 to the axle so that the forward motion of the implement will effect rotation of the axle in the direction indicated by the arrow in Fig. 5, and for utilizing this rotation to effect the lifting of the main frame, a pair of preferably L-shaped cranks 75 and 76 are provided and arranged to actuate suitable pitmen 77, 78. One arm of each crank is rigidly secured to the axle as by bolts 79 in such manner that the other arm will project radially therefrom substantially in vertical alignment with one of the braces 8 or 9 and in a substantially downward direction when the frame is in normal position as shown in Fig. 5, a portion of the axle being preferably milled off flat so as to afford a good seat for the crank thereon. In the form of the invention disclosed that portion of the crank 76 secured to the axle is utilized to form a key or feather to prevent relative rotation between the sleeve 53 and the axle, the bolt heads being countersunk in the crank and the sleeve being formed with a key way adapted to receive it, best shown in Fig. 5, although if desired any other convenient means for preventing rotation of the sleeve on the axle but permitting its longitudinal movement thereon may be employed.

The pitmen 77 and 78 are each preferably composed of two complementary members positioned one on each side of the adjacent crank and movably secured thereto by a pivot bolt 80 and also on each side of the adjacent brace 8 or 9. Adjacent the upper ends of each pitman a substantially vertically extending closed slot 81 is provided and adapted for the reception of a transversely extending supporting bolt 82 which passes through and is movable therein and also passes through a suitable aperture in the adjacent brace 8 or 9 so that the weight of the brace, and in turn that of the main frame, is supported by the pitmen through the contact of the supporting bolts with the lower extremities of the slots.

In the operation of implements of this character it is desirable to provide means for controlling the frame lifting means from the tractor or other source of motive power which is used to draw the implement, and for this purpose, in the form of the invention disclosed, a substantially vertically extending control lever 85 is pivoted at its lower end by a pivot bolt 86 to some convenient portion of the implement such as one of the struts 40, the upper end of the lever being adapted for the attachment of a cord 87 extending forwardly to some point adjacent the operator's seat on the tractor. The control lever is connected by a rearwardly extending link 88 to one arm of a three armed lever 90, best shown in Fig. 7, another arm of which is pivoted on a pivot bolt 92 extending horizontally through a support 93 rigidly secured to the lower beam 39 substantially at the center thereof. That portion of the lever 90 which is pivoted to the support is preferably composed of a pair of similar complementary flat plates positioned one on each side of the support, the arm to which the link 88 is attached being riveted therebetween. The third arm of the lever 90 formed by the forward ends of the plates is arranged to extend forwardly through a vertical slot 95 in an upright 96 extending vertically between the upper and lower beams 38 and 39 and riveted thereto thus forming a guide for the arm, the whole arrangement being such that when the control lever 85 is pulled forwardly from the position shown in Fig. 2 by means of the cord 87, the forwardly extending arm of the three armed lever 90 will be depressed from the position shown in Fig. 7 thereby simultaneously depressing the inner ends of a pair of vertically positioned bell cranks 100, 101 respectively pivoted to supports 102 riveted to and extending upwardly from the lower beam 39 and positioned on opposite sides of the center line of the implement and at equal distances therefrom, the three armed lever 90 being disposed substantially on the center line of the implement. The bell cranks are so arranged that each has a substantially vertically extending portion and a substantially horizontally extending portion, the inner ends of the latter as stated being cooperative with the three armed lever. To the vertically extending portion of the crank 101 is rigidly secured a downwardly depending arm 104 terminating in a fork 105 which engages loosely over the link 63 and on the right hand side of the fork the link is provided with a transversely extending pin 106 so disposed that suitable movement of the fork to the right will first bring its edge into engagement with the pin and thereafter effect a corresponding movement of the link to move the sliding sleeve 53 to the right to engage the clutch, such movement of the fork being effected by suitable depression of the inner end of the horizontal arm of the bell crank lever 101 through movement of the three armed lever 90 when the cord 87 is pulled forwardly.

For holding the braces 8 and 9 in raised position, suitable latching means are provided, preferably comprising a pair of latches 110 and 111 each having its lower end respectively curved outwardly and pivoted on a bolt 112 extending through and carried by the adjacent outer end of the lower beam 39 and through a keeper 113 riveted to the beam and having a portion spaced therefrom to provide a recess between such portion and the beam for the reception of the latch. The major portions of the latches are preferably disposed adjacent the respective uprights 36 at opposite sides of the implement and inclined slightly outwardly so that the outer edge of each latch angularly overhangs the normally subjacent brace 8 or 9, each latch being movably connected adjacent its upper extremity by the horizontally disposed link 115 with the proper extremity of the vertical arm of the adjacent bell crank 100 or 101, the arrangement of the parts being such that the depression of the horizontal arms of the bell cranks by the initial movement of the three armed lever 90 will result in withdrawing the latches from the position shown in Fig. 3 to the position shown in Fig. 4 in which the latches are entirely clear from said paths of the braces 8 and 9. Springs 118 are disposed between the links 115 and the adjacent uprights 36 in such manner as to tend at all times to draw the links outwardly to bring the latches into the paths of the braces.

With the several parts constructed and assembled substantially as hereinbefore described, the operation thereof may be briefly described as follows: Under normal conditions during the cultivating or other agricultural operation the main frame is lowered, the clutch members disengaged and the several parts substantially in the position best shown in Figs. 2, 3 and 5. When the end of the row is reached or if for any other reason it be desired to raise the main frame so as to withdraw the tools from the ground, the operator pulls forward on the cord 87 which serves to depress the forward end of the three armed lever 90, in turn depressing the horizontal arms of the bell cranks 100, 101 and swinging the fork 105 to the right into contact with the pin 106, thus forcing the link 63 to the right to engage the clutch members, the position of the center line of arm 104 at substantially the limit of this movement being indicated in broken lines in Fig. 3. Simultaneously with the movement of the link 63, the trip 66 is depressed from the position shown in Fig. 3 to that shown in Fig. 4 while the inward movement of the links 115 under the influence of the bell cranks causes the latches 110 and 111 to be temporarily retracted from the path of the braces 8 and 9. The power wheel 24, which is preferably provided with studs 120 to prevent excessive slippage, being now locked to the axle 22, is effective to rotate the latter in the direction shown by the arrow in Fig. 5 thus swinging the cranks 75 and 76 upwardly and in turn moving the pitmen in a similar direction to lift the main frame, through bolts 82 and braces 8 and 9. Ordinarily, as soon as the clutch members are engaged, the operator releases the tension on the cord 87 which permits the bell cranks to assume their normal position shown in Fig. 3 under the influence of springs 118, the clutch members being thereafter held in engagement through frictional contact of their cooperative teeth. As the upward movement of the braces is continued, their contact with the outer edges of the upwardly divergent latches is effective to force the latter inwardly into alignment or substantial alignment with the uprights 36 as shown in Fig. 4, to permit the braces to pass the upper ends of the latches, but as soon as the braces have cleared the latches, the latter are immediately drawn back to normal position by the springs 118 to intercept the braces upon reverse movement and support the same in raised position.

At about the time when the lower edges of the braces clear the upper ends of the latches, the upper edge of the brace 8 contacts with the trip 66 which thereafter moves up with the brace until the latter attains approximately the position indicated in dotted lines in Fig. 3, producing a sufficient elevation of the trip to entirely disengage the clutch and thus release the connection between the power wheel 24 and the axle and permit the frame, pitmen and cranks to drop back in reverse direction under the action of gravity until the braces come into contact with and are supported by the upper extremities of the latches, in which position the pitmen are supported in partially raised position through contact of the supporting bolts 82 with the upper ends of the slots 81. When it is desired to again lower the frame to operative position, a slight forward pull on the cord 87 is sufficient to temporarily disengage the latches from beneath the braces to permit the frame, pitmen and cranks to fall under the action of gravity, the clearance between the pin 106 and the fork 105 being sufficient to permit the disengagement of the latches as aforesaid by a slight pull on the cord without effecting the engagement of the clutch, which engagement can, however, be readily brought about by a sufficient movement of the cord to swing the control lever 85 to the limit of its forward travel.

Reference has already been made to relative angular adjustment of the sides of the main frame through the medium of the hand levers 41 and it is for the purpose of permitting such adjustment that the slots 81 are provided in the pitmen for, of course, in the absence of such slots it would be impossible to effect a relative elevation of one side of the frame with respect to the other. However, by arranging the supporting bolts 82 in the slots instead of in apertures in the pitmen of substantially the diameter of the bolts, either bolt may be moved relatively to its pitman by suitable manipulation of the adjacent lever 41 so as to transfer the weight of the brace and adjacent portion of the frame which is normally supported on the lower end of the slot to the lug 46 of the lever and thus temporarily raise the adjacent portion of the frame to effect an angular inclination of the whole frame to better adapt the implement for some given condition of operation.

While I have herein described with considerable particularity a preferred embodiment of my invention as embodied in a cultivator I do not thereby desire or intend to in any way limit the use of the invention to that particular type of agricultural implement nor to any precise details of construction and arrangement of the various parts, as the latter may be suitably modified and varied in details of form and arrangement and the invention embodied in other types of agricultural implements as may be desired, without departing from the spirit and scope of the invention as defined in the appended claims.

Having thus described my invention I claim and desire to protect by Letters Patent of the United States:

1. In an agricultural implement, the combination of a main tool carrying frame, an axle, ground wheels normally freely rotatable on said axle, an auxiliary frame supported from said axle, a clutch adapted to lock one of said wheels to said axle to rotate the axle, manually operable control means carried by said auxiliary frame adapted to effect the engagement of said clutch, a crank rotatable with the axle, a pitman extending between said crank and said main frame, a movable trip carried by said auxiliary frame, means connecting said trip and said clutch, a latch, means operative to normally maintain said latch in the path of a portion of said frame, and means operative to effect the withdrawal of said latch by a movement of said control means.

2. In an agricultural implement, the combination of a main tool carrying frame, an axle, ground wheels normally rotatable on said axle, an auxiliary frame supported from said axle, a clutch adapted to lock one of said wheels to said axle, means comprising a crank and a pitman operative to lift said main frame relatively to said axle when said clutch is engaged, and manually operable means comprising a pair of levers carried by said auxiliary frame on opposite sides of the center line of the implement adapted to effect independent local vertical displacement of the respectively adjacent portions of the main frame whereby the main frame may be adjustably inclined as a whole with respect to said auxiliary frame.

3. In an agricultural implement, the combination of a main tool carrying frame, an axle, ground wheels normally freely rotatable on said axle, a vertically disposed auxiliary frame supported from said axle, a clutch adapted to lock one of said wheels to said axle, a crank carried by said axle adjacent each of said wheels, a pitman movably secured to said crank and extending between said crank and said main frame, a vertically movable trip carried by said auxiliary frame, means connecting said trip and said clutch, a pair of latches carried by said auxiliary frame operative to maintain the main frame in raised position, a pair of bell cranks oppositely disposed on said auxiliary frame and respectively connected with said latches, means for communicating motion of one of said bell cranks to the means connecting said trip and said clutch, and manually operable means effective to move the bell cranks to effect corresponding movement of said latches and the engagement of said clutch, said trip being operative when said main frame has been raised to a predetermined position to automatically effect the disengagement of said clutch.

4. In an agricultural implement, the combination of a main substantially horizontally extending tool carrying frame, an axle, ground wheels normally freely rotatable on said axle, a vertically disposed auxiliary frame supported from said axle, means for connecting said auxiliary frame and said main frame and forming a common center for relative movement of said frames, a clutch adapted to lock one of said wheels to said axle, means for effecting vertical movement of said main frame with respect to said auxiliary frame when said clutch is engaged, manually operable control means carried by said auxiliary frame for effecting engagement of said clutch, automatically operative means carried by said auxiliary frame for effecting disengagement of said clutch when said main frame has been raised to a predetermined position, and latches operative to automatically assume a position to support said main frame in raised position, said control means being adapted to effect a movement of said latches from said engaging position to permit said frame to descend from raised to normal position.

In witness whereof, I have hereunto set my hand this 18th day of April, 1921.

JACOB W. DOWLER.